United States Patent [19]
Zuk

[11] Patent Number: 4,569,078
[45] Date of Patent: Feb. 4, 1986

[54] IMAGE SENSOR

[75] Inventor: David M. Zuk, Ann Arbor, Mich.

[73] Assignee: Environmental Research Institute of Michigan, Ann Arbor, Mich.

[21] Appl. No.: 419,260

[22] Filed: Sep. 17, 1982

[51] Int. Cl.³ .......................... G06K 7/14; G01C 3/08
[52] U.S. Cl. ....................................... 382/1; 307/516; 307/526; 328/134; 356/5
[58] Field of Search .................... 328/133, 134; 382/1; 358/113; 356/5; 307/510, 514, 516, 525, 526

[56] References Cited

U.S. PATENT DOCUMENTS

| | | | |
|---|---|---|---|
| 3,652,784 | 3/1972 | Wupper et al. | 358/113 |
| 3,779,645 | 12/1973 | Nakazawa et al. | 356/5 |
| 3,852,579 | 12/1974 | Sohn et al. | 356/5 |
| 3,941,982 | 3/1976 | Knollenberg et al. | 382/41 |
| 4,297,030 | 10/1981 | Chaborski | 356/5 |
| 4,400,664 | 8/1983 | Moore | 328/133 |

Primary Examiner—Leo H. Boudreau
Assistant Examiner—Joseph Mancuso
Attorney, Agent, or Firm—Krass & Young

[57] ABSTRACT

An image sensor for generating multi-bit digital pixel values for analyses in a digital image processor. A phase detector is utilized for detecting the relative phase difference between a modulation reference waveform for modulating a light source and the reflected information waveform from the illuminated target area. A high speed digital counter is driven by a phase locked loop frequency multiplier. The counter is enabled and reset by digital logic levels derived from the reference and signal waveforms. A latch is provided to store the count on the counter output when the counter is reset to thereby provide a multi-bit digital pixel value representative of characteristics of the target being sensed.

7 Claims, 6 Drawing Figures

IMAGE SENSOR

DESCRIPTION

1. Technical Field

This invention relates to image processing systems and, more particularly, to image sensors for generating multi-bit pixel values.

2. Background Art

Digital image processing systems are used in a variety of applications for automatically analyzing image data. Such applications include automatic recognition of military targets, character recognition systems, printed circuit board inspection systems, vision control for automated robots and the like. These image processing systems generally employ two broad classes of functional components: an image sensor for detecting characteristics of the object or objects in the target area of interest and converting the information into digital pixel values; and analysis logic circuitry for processing the digital pixel values. In many of the image analyzer systems the detected information is reduced to binary ones or zeroes using a thresholding technique. However, the Environmental Research Institute of Michigan, the assignee of the present invention, has devised an image analyzer system sold under its mark "Cytocomputer" that is capable of analyzing images represented by multi-bit pixel values. Included in the literature describing the Cytocomputer image analyzing system are U.S. Pat. No. 4,167,728; U.S. Pat. No. 4,322,716; and U.S. Ser. No. 178,312, filed Aug. 15, 1980, now U.S. Pat. No. 4,395,696, all of which are hereby incorporated by reference. Among the several advantages of the Cytocomputer system is its ability to analyze so-called "3-dimensional" image data where the multi-bit pixel values represent relative distance or range between the contours of the objects being sensed and the image sensor. In such applications it is therefore important that the pixel values accurately reflect the true relative range between the image sensor and the target.

One image sensor used in the past for gathering 3-D data employed pulse forming networks for a reference waveform used to modulate an illuminating light source and the reflected information signal from the target. The outputs of the pulse forming networks are used to toggle an RS flip-flop. The duty cycle of the flip-flop corresponds to the phase difference between the pulses occurring from the reference and information waveform inputs. A differential amplifier and low-pass filter connected to the outputs of the flip-flop serve to convert the varying duty cycle square wave output from the flip-flop into a DC voltage. The output of the low-pass filter is then connected to a analog-to-digital converter to provide the multi-bit pixel values.

Unfortunately, this type of image sensor has some drawbacks. Experience with this type of sensor shows that its transfer function is more closely represented by the dotted line in FIG. 1. The region of rapidly decreasing output is referred to as the snap back region. If the targets have this so-called snap back region occurring within their perimeter it becomes difficult for the analysis logic to process the data properly. Another problem with this type of phase detector is that a noisy signal will cause the input-output transfer function of the phase detector to round off the peaks.

The present invention is directed to solving one or more of these problems.

SUMMARY OF THE INVENTION

According to the present invention the image sensor employs a light source for illuminating the target of interest. The light source is modulated by a reference signal at a given frequency. Detector means are provided for receiving light reflected from the target and generating an information waveform in response thereto. Improved phase detector circuitry is employed to detect the relative phase difference between the reference and information waveforms. The detector employs comparator circuits for converting the reference and information waveforms into digital logic level signals. A multi-bit digital counter is driven at a fast clock frequency by a phase locked loop frequency multiplier. The counter is enabled to begin counting at the clock frequency upon receipt of an edge of one of the digital levels and it is reset upon the occurrence of a corresponding edge of the other digital logic level signal. Storage means coupled to the counter output are operative to store the count on the counter output after the counter has stopped counting whereby the storage means provides a multi-bit digital pixel value representative of characteristics of the target being sensed.

This approach eliminates the "snap back" problem encountered in the previously used approach and thereby provides extremely accurate image data. It is not as sensitive to noise and can be constructed of relatively inexpensive standardized electronic components. In the preferred embodiment a pair of high speed counters and associated latches are alternately employed to provide the multi-bit pixel values to the digital image processor for analysis. This approach further increases the accuracy of the sensed data.

BRIEF DESCRIPTION OF THE DRAWINGS

These and other advantages of the present invention will become apparent to one skilled in the art upon reading the following specification and by reference to the drawings in which.

DESCRIPTION OF THE PREFERRED EMBODIMENT

Figure 2:
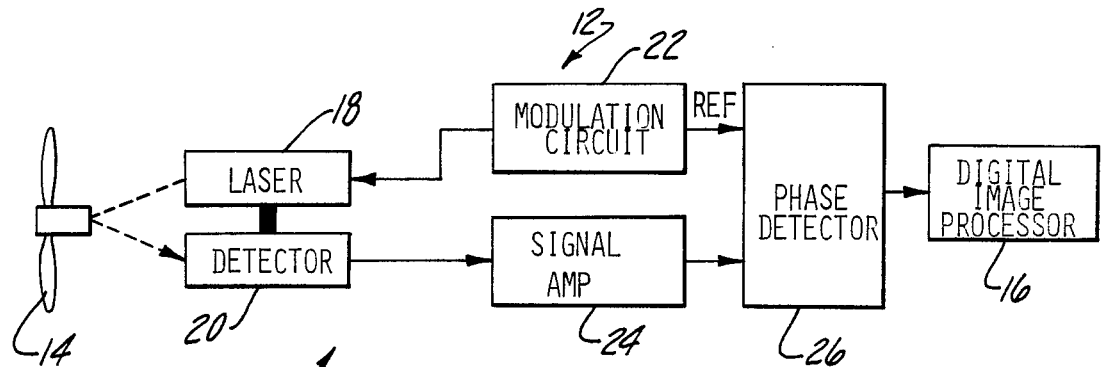
FIG. 2 is a block diagram of an image analyzer system employing the present invention.

Turning now to the drawings, especially FIG. 2, an image analyzer system 10 is shown incorporating an image sensor portion generally designated by the numeral 12 for generating multi-bit pixel values associated with characteristics of a target 14 for analysis by a digital image processor 16. In the disclosed embodiment the target 14 takes the form of a propeller. However, it should be understood that the present invention is capable of generating pixel values for a wide variety of targets and thus, the term "target" should be construed in its broadest sense. Likewise, image processor 16 may take the form of any suitable digital image processor capable of operating on matrices of digital image data. While the present invention finds particular utility with serial neighborhood processors like the aforementioned Cytocomputer systems for performing 3-D image analysis, still other types of processors may take advantage of the features of the present invention.

Image sensor 12, in this embodiment utilizes a light source 18 such as a helium-neon laser for illuminating portions of target 14. A light detector 20 is physically coupled to laser 18. This combination is scanned across the object 14 with the detector 20 providing an information waveform output as a function of a light reflected from the target. Detector 20 may take the form of any suitable transducer such as a photodiode. Instead of scanning the object by moving the laser 18 and detector 20 together, the laser may be deflected to scan the object and an array of photo detectors may be used. However, the former approach is preferred.

Figure 5:
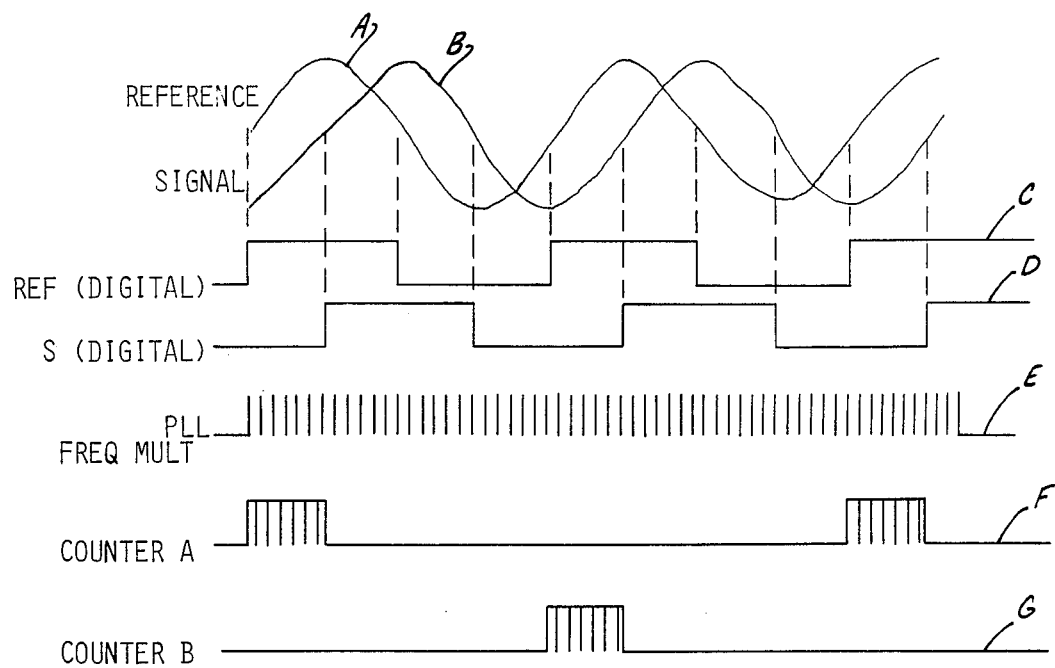
FIG. 5 is a timing chart useful in ascertaining the operation of the present invention.

A modulation circuit 22 is employed for modulating laser 18. In the preferred embodiment, modulation circuit 22 employs conventional "mode locking" techniques to amplitude modulate laser 18 using acousto-optical devices. Modulation circuit 22 also supplies a reference waveform at its output which is a function of the signal used to modulate laser 18. The waveform labeled A in FIG. 5 illustrates a typical reference signal in the form of a sinusoidal waveform.

Figure 1:
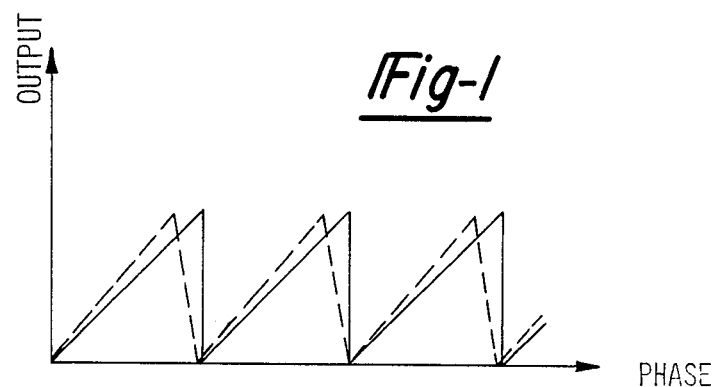
FIG. 1 is a waveform diagram illustrating in solid lines the output of the image sensor of the present invention as a function of the phase difference between the reference and information waveforms.

The output of detector 20 is coupled to a signal amplifier 24 including conventional preamplifiers, filters, and limiting amplifiers to shape the waveform generated by detector 20. A typical information signal "S" from network 24 is shown in FIG. 5 and labeled as waveform B. The difference in phase between the reference and information waveform is the function of the distance between laser 18, the detector 20, and the scanned portion of target 14. Referring to the solid line portion of the chart of FIG. 1, each triangular shaped segment represents the ambiguity interval of the image sensor. The output is a function of the change in range or distance of the object within each ambiguity interval. It can be appreciated that the further the distance the scanned object portion is away from laser 18, the larger the phase difference between the reflected waveform and the reference, within a given ambiguity interval. It can also be appreciated that if the transfer function is similar to that shown in the dotted lines that the resultant output will not be very accurate if the phase relationship occurs within the snap back region.

Phase detector 26 of the present invention is directed to solving this problem.

Figure 3:
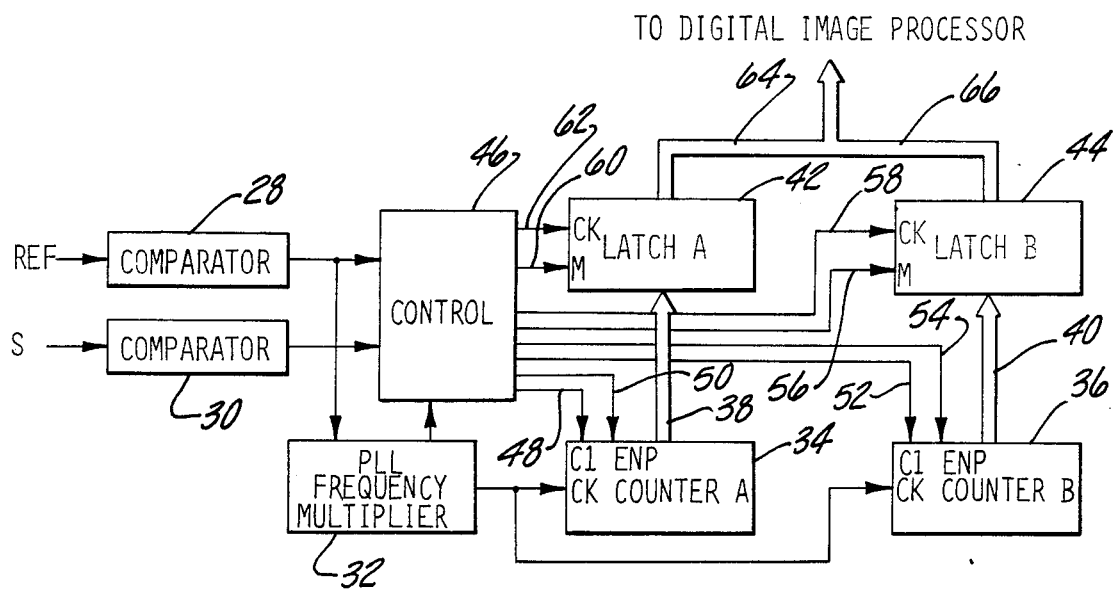
FIG. 3 is a block diagram of the preferred embodiment of the phase detector utilized in the image sensor of the present invention.

FIG. 3 shows phase detector 26 in block diagram form. A pair of comparators 28 and 30 are utilized to convert the reference and information signal waveform into digital logic levels, respectively. In this embodiment comparators 28 and 30 take the form of standard components such as National Semiconductor LM361 devices. A phase locked loop frequency multiplier 32 coupled to the output of comparator 28 is utilized to provide clock pulses to a pair of high speed counters 34 and 36. Counters 34 and 36 each provide an eight bit output on lines 38 and 40, respectively, and may comprise standard 74S163 Texas Instrument counters. Frequency multiplier 32, is also a conventional device adapted to provide output pulses in phase with its input trigger pulses but at some multiple of the input pulse frequency. The frequency of the reference pulses should be multiplied by multiplier 32 by a factor which is an integral multiple of the number of output bits of counters 34 or 36. In the present invention multiplier 32 multiplies the frequency of the reference trigger signals by $2^8$ or 256. Frequency multipliers of this type are available from Zeta Laboratories, Inc. from Santa Clara, Calif.; Frequency Sources, Inc. of Chelmsford, Md. and other widely available sources.

The outputs of counters 34 and 36 are coupled to multi-bit latches 42 and 44, respectively. The outputs of latches 42 and 44 are alternately coupled to a data storage device (not shown) to provide the pixel values generated by the image sensor to a digital image processor for analysis.

Figure 4:
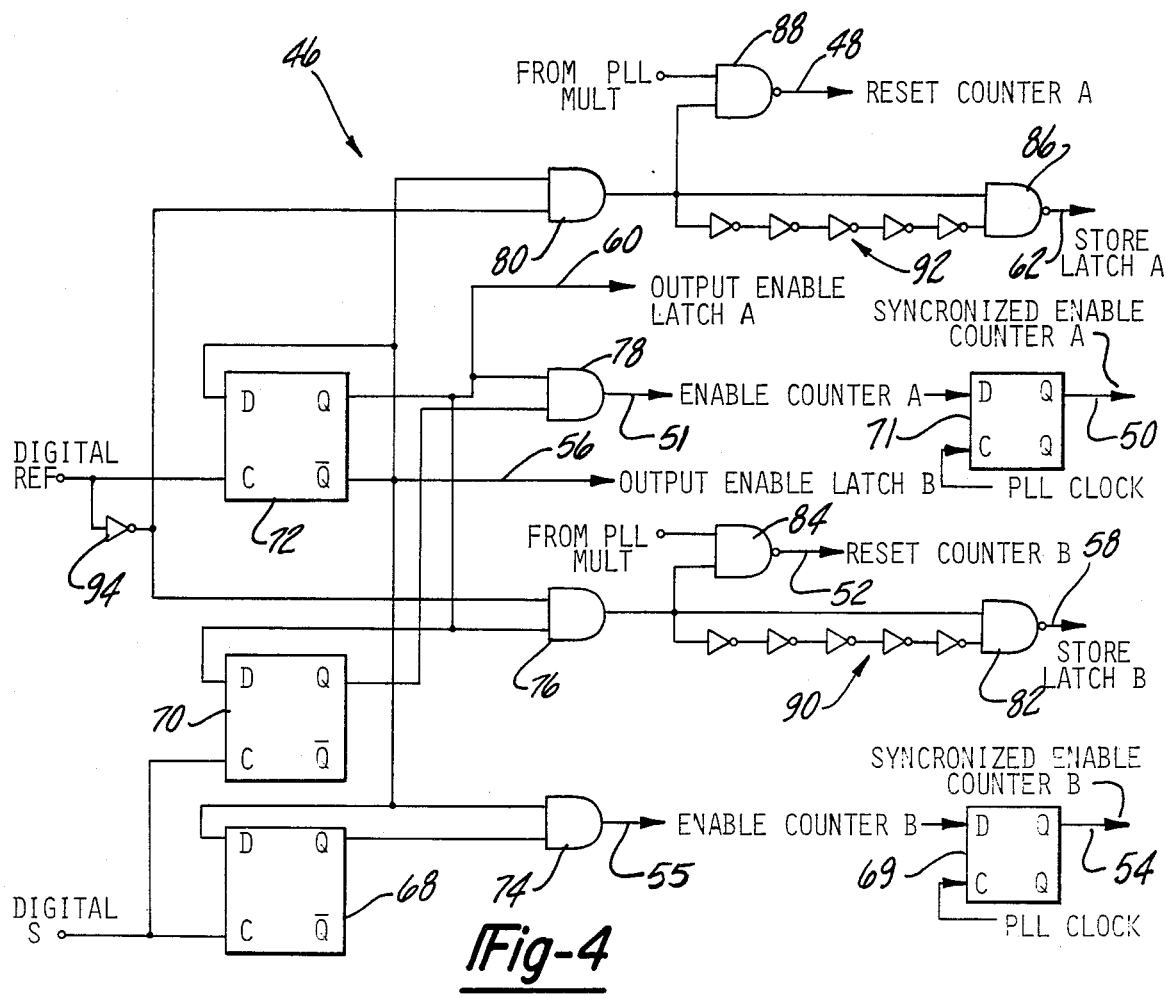
FIG. 4 is a schematic diagram of the control portion the phase detector of FIG. 3.

Control circuitry 46 is responsible for enabling and resetting counters 34 and 36, as well as the transfer of data from the counters to their respective latches and, thence, to the image processor. Control circuitry 46 provides appropriate signal levels on lines 48 and 50 to reset and enable counter 34. Similarly, signals on lines 52 and 54 serve to reset and enable counter 36. Signals on lines 56 and 58 serve as output enable signals and store signals for latch 44 as do signals on line 60 and 62 for latch 42. The store signals on lines 58 and 62 serve as clocks to cause the latches to store the current contents of their respective counter outputs when the store signal is received. Output enable signals on lines 56 and 60 operate to cause the latches to alternately couple the eight bit values stored therein to the image processor over lines 64 and 66. Control 46 may take a variety of forms to perform the functions as will be more fully explained below. FIG. 4 shows an example of a suitable circuit for accomplishing these functions. The control circuit 46 of FIG. 4 employs a group of D-type flip-flops 68–72 such as SN74S74 devices, AND gates 74–80, NAND gates 82–88, a series of pulse forming inverter networks 90–92; and suitable means such as inverter 94 to provide a logical inversion of the digital reference logic level.

With additional reference to FIG. 5, the operation of the present invention will now be described. The reference and information waveforms labeled A and B, respectively, are converted by comparators 28 and 30 to TTL levels as represented by waveforms C and D. The clock signals from frequency multiplier 32 are schematically represented as waveform E in FIG. 5. It should be noted that the clock pulses in actuality occur much faster than represented in the timing diagram, here, 256 pulses being generated for each cycle of the reference signal C.

Upon receipt of the rising edge of the digital reference level C, control 46 generates an enable signal on line 50 to begin the counting process of counter 34. Counter 34 counts the number of clock pulses from multiplier 32 until the rising edge of the digital signal level D occurs at which time control 46 drops the enable signal on line 50 which stops the counter 34. The number of clock pulses counted by counter 34 thus is in direct proportion to the phase difference between the reference waveform A and the information waveform B. The operation of counter A is schematically represented by waveform F in FIG. 5.

Upon receipt of the next rising edge of the digital reference level C, control 46 provides an enabling signal over line 54 to counter 36 so that it now begins to count the clock signals from multiplier 32. During this cycle of reference level C, control 46 generates a store signal on line 62 to clock latch 42 causing it to store the current contents of counter 34. Thereafter, an output enable signal on line 60 is generated causing latch 42 to place its contents on line 64 for processing by the digital image processor. The control 46 generates a clear to counter 34 via line 48 at the same time as the signal on line 60. Upon detection of the next rising edge of the digital information level D, control 46 clears the enable on line 54 to counter 36 thereby keeping the counter 36 from counting more clock pulses from multiplier 32. The operation of counter 36 is illustrated by waveform G in FIG. 5.

The next rising edge of reference level C causes control 46 to generate a count enable signal to counter 34 over line 50 to enable it to begin counting again. During this cycle of the reference level C control 46 also generates a store signal on line 58 to clock the contents of counter 36 into latch 44. Thereafter, a signal on line 56 from control 46 to latch 44 causes it to provide its output to line 66 for storage and further processing by the digital image processor. The control 46 generates a clear to counter 36 via line 52 at the same time as the signal on line 56.

Figure 6:
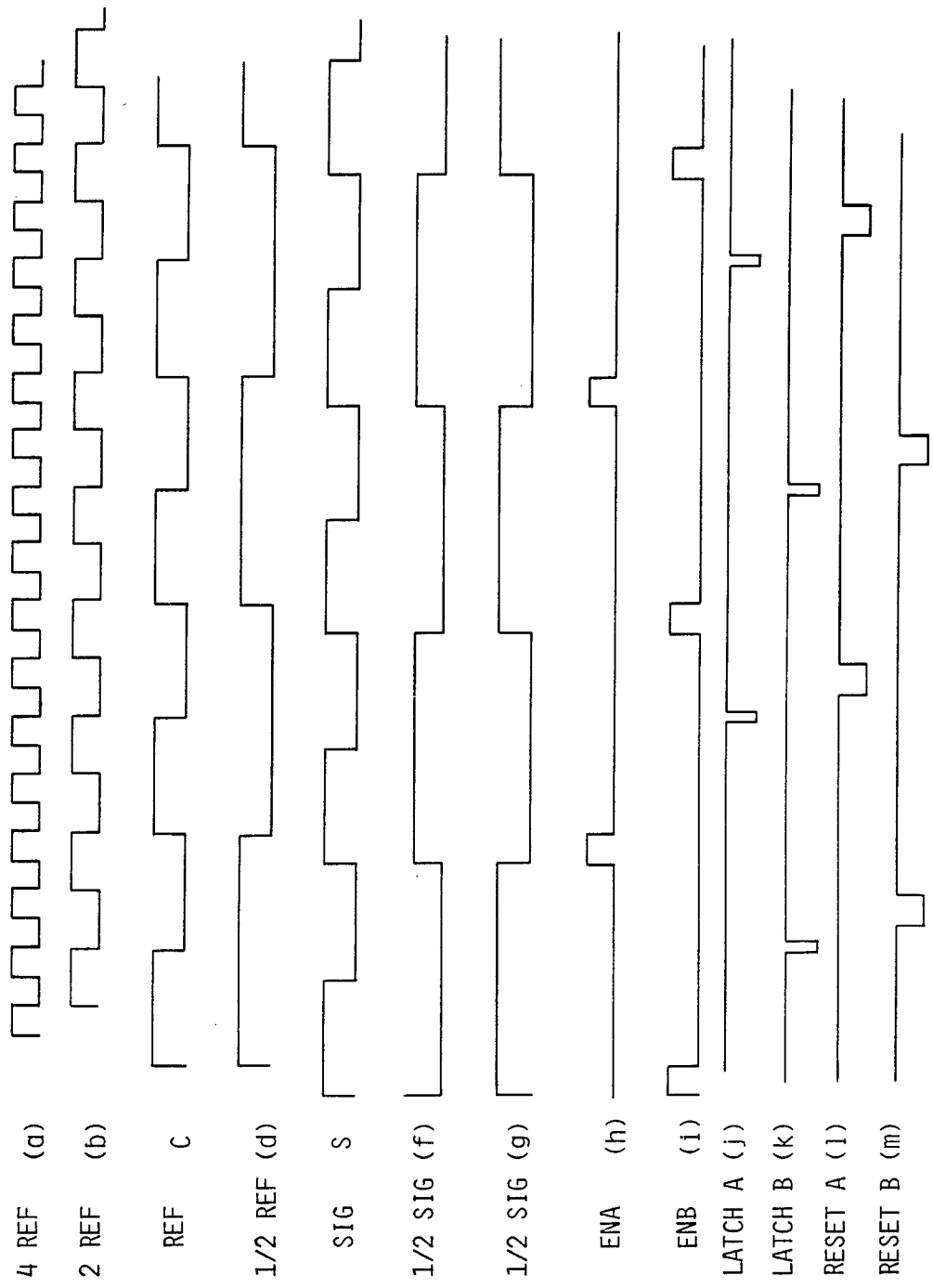
FIG. 6 is a timing chart of signals utilized in the control portion of the preferred embodiment.

The generation of the individual control signals by control 46 may be appreciated by reference to FIG. 4 and its associated timing diagram of FIG. 6.

The signals 4REF (level a in FIG. 6) and 2REF (level b in FIG. 6) are generated by a phase-locked-loop (PLL) circuitry in multiplier 32 and are respectively, 4 and 2 times the frequency of the reference signal level c. The timing relationship between a, b and c levels is maintained by the PLL. The digital reference level c goes to the C input of the D flip-flop 72. The output of flip-flop 72 is represented in the timing diagram as level d, ½ REF. Signal level d on line 60 is used to enable Latch A (42). The $\overline{Q}$ output of flip-flop 72 generates a signal on line 56 which is used to enable latch B (44) when latch A is not enabled. The digital signal S is coupled to inputs of flip-flops 68 and 70. The flip-flops 68 and 70 change state on the low to high transition of digital signal S. The D input of flip-flop 70 is tied to the Q output of flip-flop 72 and is thus phased to flip-flop 72. The output of flip-flop 70 is represented by level f. Levels d and f are input to AND gate 78 which generates the ENABLE COUNTER A signal on line 51 of FIG. 5. The ENABLE COUNTER A signal on line 51 is synchronized by flip-flop 71 to generate the SYNCRHONIZED ENABLE COUNTER A signal on line 50. The flip-flop 71 insures that the Enable signal on line 50 changes in phase with the clock pulse from the PLL, 32 thus insuring proper timing relationship between the enable and clock inputs to counter A 34. Without the synchronized enable signal, improper operation of counter A 34 is possible. The enable signal is labeled h in FIG. 6. In a similar manner, flip-flop 68 is phased to $\overline{Q}$ of flip-flop 72 and generates level g as its output. Level g and the logical inverse of level d are input to AND gate 74 so that the output on line 55 is synchronized by flip-flop 69 which generates the output on line 54 which enables counter b (36).

The Store Latch A signal (level j) is generated from the inverse of Reference level c and the inverse of level d by gates 80 and 86 and the inverters 92. The AND gate 80 performs a logical "and" of the inverse of level c and the inverse of level d. The output of gate 80 goes to the NAND gate 86 and the inverters 92. The inverters invert and delay the signal reaching the inputs of gate 86 and result in a negative output on line 62. The duration of the low output on line 62 is equal to the delay in the inverters and only occurs on the rising edge of the output of gate 80. The Reset Counter A signal on line 48 (level 1) is also generated from the output of gate 80 and a signal from the PLL via gate 88. The signal from the PLL is the AND of level a and the inverse of level b.

Gate 76 uses levels d and the inverse of level c to generate the store Latch B signal on line 58 (level k). The inverters 90 and NAND gate 82 produce a negative pulse when the output of gate 76 goes high. Components 90 and 82 operate the same as components 92 and 86 above except they use different input signals. Gate 84 takes the output from 76 and gates it with the AND of levels a and the inverse of level b to generate the Reset Counter B signal on line 52 (level m).

Those skilled in the art can now appreciate that the image sensor of the present invention provides decided advantages over those approaches used in the past. The snap back region experienced in prior art approaches is effectively eliminated by the use of the all digital scheme of the present invention. Extremely accurate pixel values are generated over a wide range of modulation frequencies. The use of the alternating counters and associated latches is particularly advantageous because a measurement is made on each zero crossing of the information signal. Measuring each zero crossing enables one to either increase the data rate (i.e. measurements per second) or average measurements and thus reduce the noise.

Still other advantages of the present invention will become apparent to one skilled in the art upon a study of the drawings, specification and the following claims.

I claim:

1. An image sensor for generating multi-bit digital pixel values for analysis in a digital image processor, said image sensor comprising:

a single oscillator;

a light source for illuminating a target area containing one or more objects;

means for generating a modulation reference waveform at a given frequency for modulating the light source, said means comprising said oscillator;

detector means for receiving light from the object and generating an information waveform associated therewith;

phase detector means for detecting the phase difference between the reference waveform and the information waveform, said phase detector means including:

first and second comparator means for converting said reference and information waveforms, respectively, into digital logic level signals;

a multi-bit digital counter having a clock input, an enable input, a reset input and an M-bit output;

clock means connected between an output of the reference waveform comparator means and the clock input of the counter for driving same at N times the frequency of the reference waveform, wherein N is an integer;

control means coupled between the comparator means and the counter, operative to enable the counter to begin counting at the clock frequency upon receipt of an edge of one of the digital logic level signals and to reset the counter upon receipt of a corresponding edge of the other digital logic level signal; and storage means coupled to the counter output and to the control means, operative to store the generated count in the counter whereby the storage means provides a multi-bit digital pixel value representative of characteristics of the target area.

2. The sensor of claim 1 wherein said clock means comprises:
a phase locked-loop frequency multiplier.

3. The image sensor of claim 1 wherein said light source is amplitude modulated.

4. The image sensor of claim 1 which further comprises:
a second digital counter and an associated second storage means, the second counter being clocked by said clock means and being alternately energized with the other counter by said control means.

5. The image sensor of claim 4 wherein said control means is operative during one cycle of the reference digital logic level signal to enable one of the counters while causing the contents of the other counter to be stored in its associated storage means and, during a succeeding cycle of the reference digital logic level, being operative to enable the other counter while storing the contents of said one counter in its associated storage means.

6. The image sensor of claim 5 wherein the control means is further operative to alternately enable the two storage means for transmitting their respective contents to an image processor.

7. An image sensor for generating three-dimensional image data where each pixel is represented by a multi-bit value, the improvement comprising:
a single oscillator;
an amplitude modulated laser and a photodetector moving in unison to scan a target area the photodetector generating a series of information waveforms;
modulating circuitry, for providing a series of reference waveforms, and comprising said oscillator;
phase detector means for detecting the phase difference between the reference and the information waveform, said phase detector including:
first and second comparator means for converting said reference and information waveforms into digital logic level signals;
a first multi-bit counter having a clock input, an enable input, a reset input and an M bit output;
a first latch means having an input connected to the output of the first counter, a store input, an output enable input, and an output;
a second multi-bit counter having a clock input, an enable input, a reset input and an M bit output;
a second latch means having an input connected to the output of the second counter, a store input, an output enable input and an output;
a phase locked loop frequency multiplier having an input connected to the reference comparator means and an output connected to the clock inputs of the first and second counters; and
control means coupled between the comparator means and the first counter and latch as well as the second counter and latch, said control means being operative to selectively control the energization of the first counter and transfer the contents of the second counter through the output of the second latch during one cycle of one of the digital logic level signals, and to control the energization of the second counter and transfer the contents of the first counter through the output of the first latch during a succeeding cycle of the digital logic level signal.

* * * * *